UNITED STATES PATENT OFFICE.

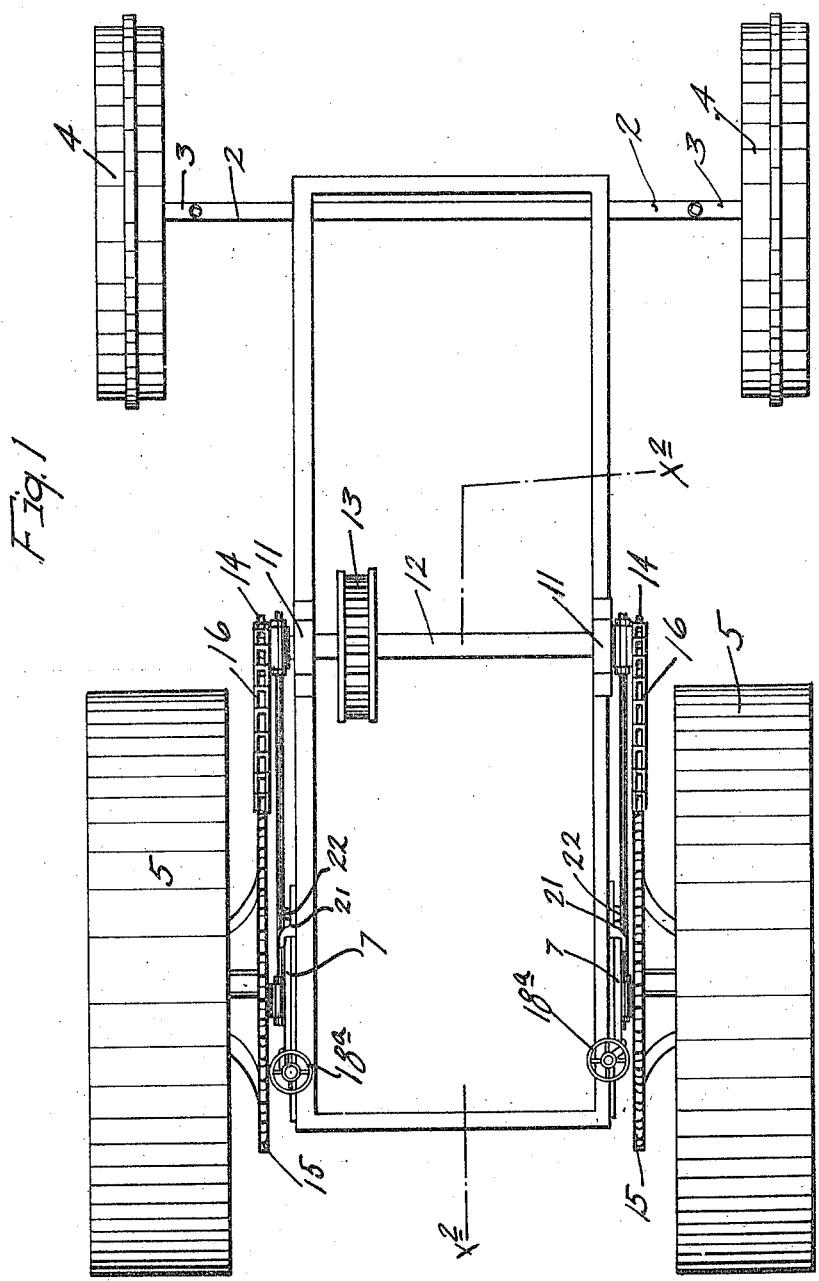

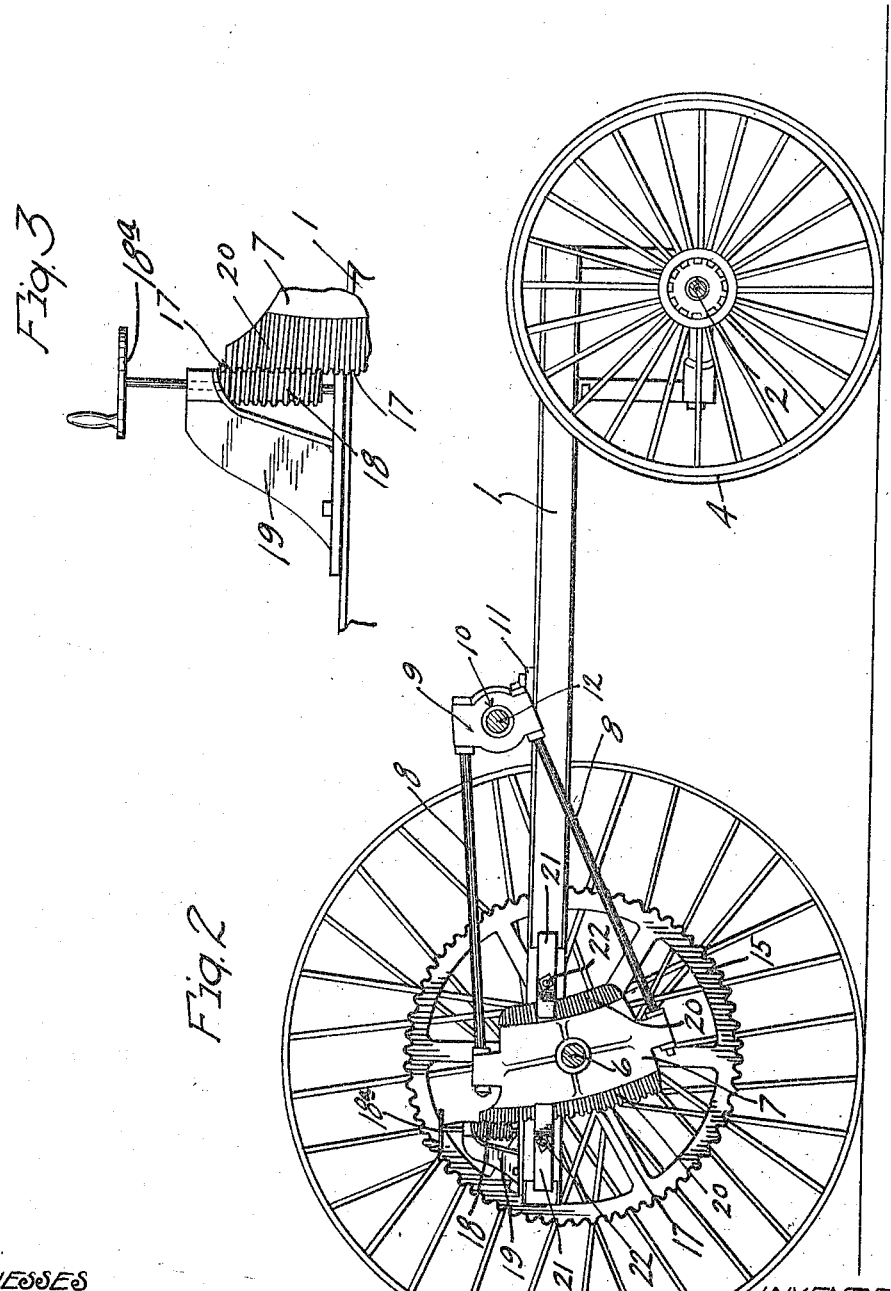

VITUS A. BOKER, OF MINNEAPOLIS, MINNESOTA.

TRACTOR-TRUCK.

1,221,183.

Specification of Letters Patent.

Patented Apr. 3, 1917.

Application filed October 18, 1915. Serial No. 56,507.

*To all whom it may concern:*

Be it known that I, VITUS A. BOKER, a citizen of the United States, residing at Minneapolis, in the county of Hennepin and State of Minnesota, have invented certain new and useful Improvements in Tractor-Trucks; and I do hereby declare the following to be a full, clear, and exact description of the invention, such as will enable others skilled in the art to which it appertains to make and use the same.

Particularly my invention has for its object to provide an improved tractor truck and is directed to improved means for vertically adjusting the traction wheels thereof, so that the tractor frame may be kept horizontal when one of the traction wheels runs in a furrow, as well as when both wheels run on level ground. Generally stated, the invention consists of the novel devices and combinations of devices hereinafter described and defined in the claims.

In the accompanying drawings which illustrate the invention, like characters indicate like parts throughout the several views.

Referring to the drawings:

Figure 1 is a plan view showing a tractor truck embodying my invention;

Fig. 2 is a view partly in side elevation and partly in vertical section on the line $x^2$ $x^2$ of Fig. 1; and Fig. 3 is a fragmentary view in side elevation showing means for vertically adjusting one of the segmental bearing plates.

The truck illustrated is a four-wheeled truck and has two rear traction wheels; but the novel feature, as hereinafter described, may be as well applied to a three-wheeled truck having traction wheels located either in front or rear of the third wheel.

Describing the truck as shown, the numeral 1 indicates a rectangular frame, to the front of which is rigidly secured a front axle 2 having pivoted knuckles or stub axles 3 to which the front or steering wheels 4 are journaled in the usual or any suitable way.

In accordance with my invention, the rear traction wheels 5 are journaled on stud-axles 6 that are rigidly secured and project outward from segmental bearing plates 7. These bearing plates 7 are, as shown, secured to the outer ends of arm-forming radius rods 8, which, at their inner ends, are secured to heads 9 mounted to oscillate on sleeve-like bearings 10 of the bearing brackets 11 that are rigidly secured to the sides of the frame 1. Extended through and journaled in the axially alined sleeves 10 of the laterally spaced bearing brackets 11, is a counter shaft 12. With the construction just described, the traction wheels 5 are adapted to be raised and lowered with their axes always a constant distance from the axis of the counter shaft 12. The counter shaft 12, at its intermediate portion, carries a gear 13 adapted to be driven from an engine, not shown, through any suitable transmission mechanism of which said gear 13 forms an element. At its ends, the counter shaft 12 carries small sprockets 14 that are alined with relatively very large sprockets 15 carried by the hubs of the respective traction wheels 5. Sprocket chains 16 run over the alined sprockets 14 and 15. Thus both traction wheels are positively driven and the driving chains 16 are neither tightened nor loosened by the independent vertical movements of the two traction wheels.

As a simple and efficient means for vertically adjusting the bearing plates 7 and for holding the same rigidly in different set adjustments, the said plates, at their curved outer edges, are provided with gear teeth 17 that constitute gear segments that are in mesh with adjusting worms 18 journaled in bearing brackets 19 rigidly secured on the rear side portions of the frame 1. The shafts of the worms 18 are provided with cranks 18ª, by means of which they may be readily rotated so as to impart the vertical adjustments to the bearing plates 7. To further and more rigidly secure the said bearing plates in different set adjustments, they are provided on their inside faces, adjacent to their inner and outer edges, with serrated segmental portions 20 adapted to be normally engaged by the corrsepondingly serrated ends of clamping bars 21 that are rigidly but detachably secured to the adjacent side portions of the frame 1 by nut-equipped clamping bolts 22.

Obviously, the bearing plates or segments 7 can be vertically adjusted, by rotation of the respective worms 18, only when the clamping bars 21 are released from the serrated surfaces 20.

With the construction above described, it is evident that the two traction wheels may be independently adjusted. Evidently, the greatest vertical adjustment between the two traction wheels is produced by adjusting the one upward and the other downward, in respect to the tractor frame. Such reverse adjustments, however, will throw the frame 1 into a more or less inclined position in a direction from front to rear. Hence, when it is desired to keep the main frame 1 in substantially perfect horizontal adjustment, the traction wheel should be arranged to run in a furrow, and for example, when plowing, will be dropped down, and the traction wheel which is to run upon the unplowed ground would simply be so adjusted or left in such adjustment, as to keep the tractor frame horizontal, both in a transverse direction and in a longitudinal direction.

In the accompanying drawings, the two traction wheels are shown as located in axial alinement, but the construction described permits the one traction wheel to be located ahead of the other and this would be accomplished either by making the one radius arm longer than the other, or by throwing the one radius arm rearward and the other forward. In the construction illustrated, the so-called radius arms are formed by the rods 8 and heads 9, to the ends of which arms, the segmental bearing plates 7 are rigidly attached. Movement of the so-called bearing plates concentric to the driving counter shaft 12 is, of course, of the utmost importance when the transmission is made through sprockets and chains, but it will also be important when transmitting through gears and shafts.

What I claim is:

1. In a truck, the combination with a truck frame, of a radius arm pivoted to said truck frame and carrying a bearing plate at its free end, said bearing plate, at its outer edge having a worm gear segment, and an adjusting worm journaled in a bearing on said frame and engaging the worm gear segment of said bearing plate for adjusting the same vertically, a clamp for securing said frame and bearing plate in different set adjustments, and a wheel journaled to said bearing plate.

2. In a truck, the combination with a truck frame, of a radius arm pivoted to said truck frame and carrying a bearing plate at its free end, the said bearing plate, at its outer edge, having a worm gear segment, an adjusting worm journaled in a bearing on said frame and engaging the worm gear segment of said bearing plate for adjusting the same vertically, a clamping bar anchored to said frame and engageable with said bearing plate to clamp the same in different set adjustments, and a wheel journaled to said bearing plate.

In testimony whereof I affix my signature in presence of two witnesses.

VITUS A. BOKER.

Witnesses:
CLARA DEMAREST,
BERNICE G. WHEELER.